B. CMEYLA.
FLOUR SIFTER.
APPLICATION FILED FEB. 24, 1921.
1,417,035.
Patented May 23, 1922.
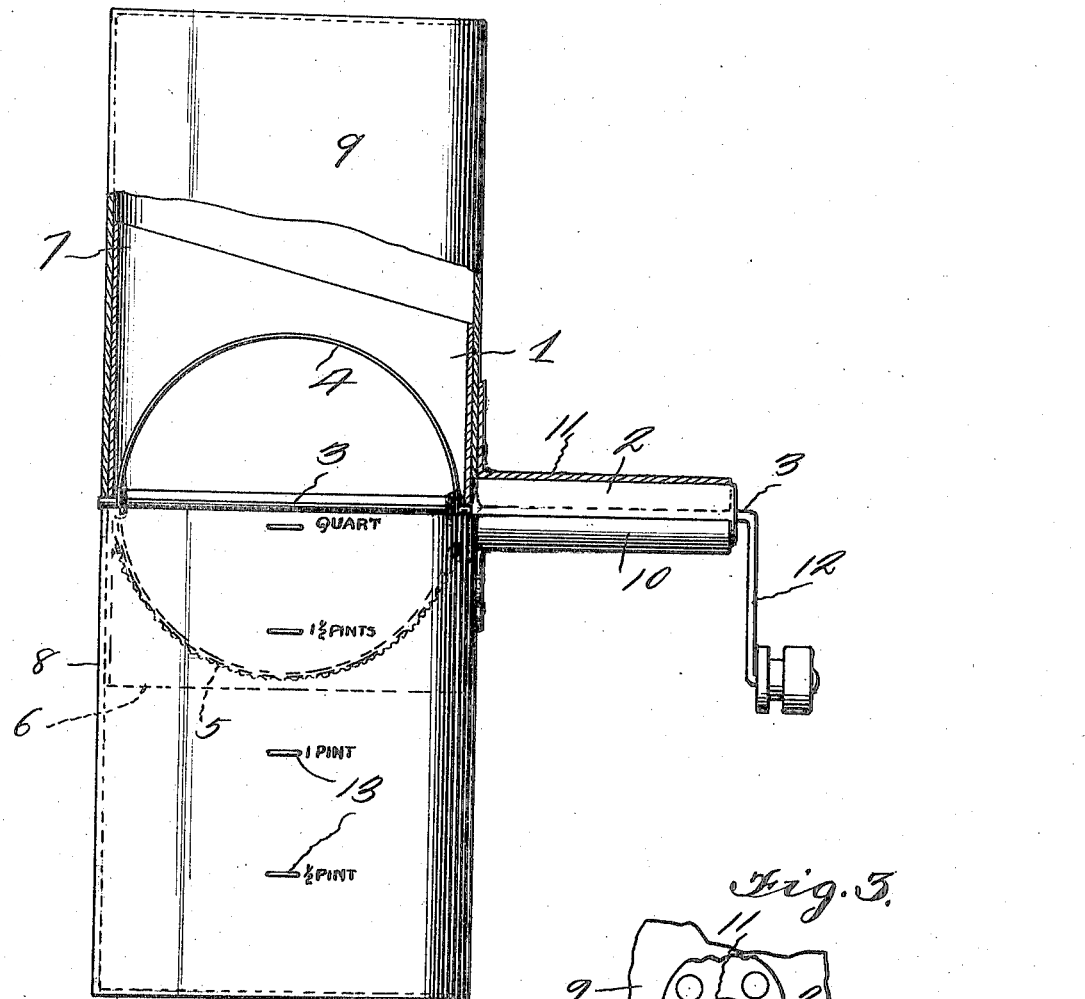
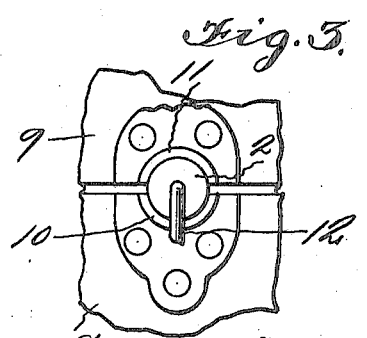
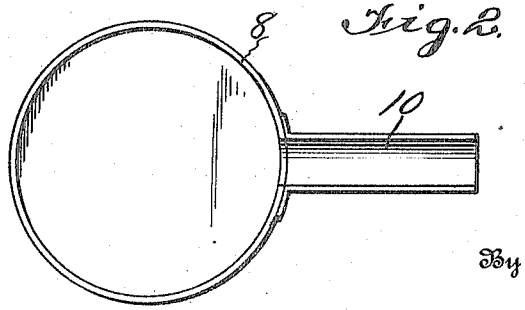
Inventor
Bozena Cmeyla
By D. Swift
Attorney

UNITED STATES PATENT OFFICE.

BOZENA CMEYLA, OF KEWAUNEE, WISCONSIN.

FLOUR SIFTER.

1,417,035. Specification of Letters Patent. Patented May 23, 1922.

Application filed February 24, 1921. Serial No. 447,483.

*To all whom it may concern:*

Be it known that I, BOZENA CMEYLA, a citizen of the United States, residing at Kewaunee, in the county of Kewaunee and State of Wisconsin, have invented a new and useful Flour Sifter; and I do hereby declare the following to be a full, clear, and exact description of the invention, such as will enable others skilled in the art to which it appertains to make and use the same.

The invention relates to flour sifters and has for its object to provide a device of this character comprising a cylindrical sifting member having a radially disposed handle spaced from its ends and a rotatable sifting element disposed in the cylindrical member and to provide receptacles adapted to receive the ends of the cylindrical sifter, said receptacle being provided with handle members semi-circular in cross section and adapted to engage opposites of the handle member of the sifter. It has been found that where material is to be sifted several times, for instance where baking powder and flour are required to be sifted three or four times in preparation for making cake or biscuits, the common practice is to sift the material into a bowl, after which the material in the bowl has to be replaced in the sifter and the operation repeated. By providing the receptacles on the ends of the sifter, the material may be sifted into one receptacle, and the sifter moved out of the ends of both receptacles and reversed, thereby allowing the material to be easily and quickly resifted into the other receptacle when the device as a whole is moved end for end, said receptacles also forming cooking utensils which may be used independently of the sifter.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the sifter showing the receptacles in position thereon and partly showing the sifter and one of the receptacles in section to better illustrate the structure.

Figure 2 is a top plan view of one of the receptacles.

Figure 3 is an end view of the sifter handle and the handles of the receptacles, showing said receptacle handle in engagement with the sifter handle.

Referring to the drawings, the numeral 1 designates a cylindrically shaped sifter, the ends of which are open, and 2 the handle carried by said sifter, said handle being cylindrically shaped and radially disposed. Rotatably mounted in the handle 2 is a shaft 3 which shaft is provided with an agitating element 4, which is rotated when the shaft 3 is rotated for forcing and sifting material through the screen 5. The ends 6 and 7 of the sifter are disposed in cylindrical receptacles 8 and 9, said receptacles adjacent their open ends being provided with handle members 10 and 11 which are semi-circular in cross section and receive the opposite sides of the sifter handle 2, thereby forming a single handle for maintaining the receptacles against displacement during a sifting operation when the crank 12 is rotated. The device as a whole is preferably made of aluminum and by the particular construction the receptacles 8 and 9 may be utilized as cooking utensils as well as in connection with the sifter.

When it is desired to sift material, the material is placed in one of the receptacles and then the end 7 of the sifter is placed in said receptacle after which the other receptacle is placed on the end 6 of the sifter and the device turned upside down to the position shown in Figure 1, after which the sifting operation may be accomplished and the material worked through the sieve 5 into the receptacle 8. When the sifting operation is to be repeated the receptacles are separated, the sifter turned end for end and disposed in the receptacles then the device as a whole turned upside down and then the second sifting operation may be accomplished. The above operation being repeated as is necessary that the material be sifted. If so desired, graduations 13 may be placed on the receptacles whereby the material may be measured, said graduations may be in pints or in pounds.

The invention having been set forth what is claimed as new and useful is:—

1. The combination with a sieve having a sifting and agitating element and a radially disposed handle spaced from the ends thereof, of receptacles telescopically engaging the ends of said sieve, said receptacles adjacent their open ends being provided with handle members radially disposed and adapted to engage the handle member of the sieve.

2. A sifting device comprising a cylindrical member having a sifting element and a radially disposed cylindrical handle, said handle having means passing therethrough for operating the sifting element, receptacles telescopically engaging the ends of the cylindrical member, said receptacles adjacent their open ends and being provided with radially disposed handle members semi-circular in transverse cross section and adapted to receive the opposite sides of the cylindrical handle of the cylindrical member of the sifter.

3. The combination with a sifter comprising a cylindrical member having both ends open, a handle member radially disposed on said cylindrical member and spaced from its ends, a sifting element disposed within the cylindrical member, of removable receptacles telescopically engaging the ends of the cylindrical member, said receptacles having their adjacent sides provided with handle members disposed adjacent the handle member of the cylindrical member and positioned where all of the handle members may be grasped by one hand of the operator.

In testimony whereof I have signed my name to this specification in the presence of two subscribing witnesses.

BOZENA CMEYLA.

Witnesses:
  HELEN MARCK,
  J. G. WALECKA.